United States Patent Office 3,788,869
Patented Jan. 29, 1974

3,788,869
CONCRETE COMPOSITIONS OR MIXES AND ADDITIVE THEREFOR
Jack B. Batdorf and Steven M. Weiss, Wilmington, Del., assignors to Hercules Incorporated, Wilmington, Del.
No Drawing. Continuation-in-part of abandoned application Ser. No. 112,029, Feb. 2, 1971. This application Jan. 11, 1972, Ser. No. 317,551
Int. Cl. C04b 7/02
U.S. Cl. 106—93          4 Claims

ABSTRACT OF THE DISCLOSURE

Disclosed are hydroxyethyl cellulose (HEC) as additive for concrete compositions or mixes, substantially dry concrete compositions comprising conventional ingredients plus HEC, and concrete compositions comprising conventional ingredients (including water) plus HEC. The HEC renders the concrete compositions (when water is added thereto) readily pumpable and gives percent total air values within American Concrete Institute specifications.

---

This application is a continuation-in-part of copending U.S. patent application Ser. No. 112,029, filed Feb. 2, 1971, now abandoned.

The present invention relates to the use of hydroxy ethyl cellulose (HEC) for concrete mixes and to concrete mixes containing said additive. More particularly it relates to an additive for concrete mixes consisting essentially of HEC and to concrete mixes which are rendered pumpable or far more readily pumpable by virtue of containing said additive.

It is intended that the following terms have the following meanings herein which are their usual meanings in this art.

Concrete.—A mixture of both coarse and fine aggregates and a cement paste, which mixture when hardened possesses a variable range of strengths for use as building materials in the building industry. The cement paste consists of water, cement, and any other admixtures desired for special property design.

Total air.—Percent by volume of air in the concrete mix including that air intentionally incorporated by means of an air-entraining agent and that incidentally entrapped during mixing.

Light-weight insulating concrete.—A special type of concrete used for thermal insulation normally containing extremely light-weight coarse aggregate and possessing total air contents as high as 35%. Dry unit concrete weights may range from 15–90 lb./ft.³ and 28-day compressive strengths from 100–1000 p.s.i.

Heavy-weight concrete.—A concrete incorporating iron-containing ores and/or steel shot and having a dry unit weight of >160 lb./ft.³ to as high as 400 lb./ft.³. Compressive strengths and air contents are similar to those of normal-weight concrete.

Light-weight structural concrete.—A concrete possessing a 28-day compressive strength of >2500 p.s.i. and a dry unit weight of about 115 lb./ft.³ or less. Air contents may range as high as 11% depending on the maximum size of the coarse aggregate. The coarse aggregate usually consists of an expanded shale, clay, slate, or slag.

Mortar.—A plastic-like mixture consisting of water, cement, sand and any desired admixtures; coarse aggregate is specifically excluded.

Normal-weight concrete.—A concrete exhibiting a minimum 28-day compressive strength of at least 2500 p.s.i. and having a dry unit weight between 135 and 160 lb./ft.³. The coarse aggregates normally used are coarse sand, gravel, crushed gravel, crushed stone (e.g., limestone, granite or traprock), slag rock and combinations thereof, all of which possess low water absorption characteristics. Air contents may range as high as about 8.5% depending on the coarse aggregate's maximum size.

Pumpability.—The ability of a concrete mix to be pumped through a pipeline without causing line blockage by aggregate segregation or excessive bleeding.

Pump-mix design concrete.—An unpumpable standard-mix design concrete which has been reproportioned to make it pumpable.

Slump (of concrete).—A test for measuring the consistency of concrete by allowing a cone of freshly-mixed concrete to "slump" under its own weight. The distance in inches which the concrete slumps or sags is its slump.

Standard-mix design concrete.—Any type of concrete which has been proportioned to meet given strength and/or placement requirements, but which may not be pumpable, and is normally placed by a bucket and crane.

Water/cement ratio.—The ratio of the amount of water, exclusive only of the water absorbed by the aggregates and sand to the amount of cement in a concrete mixture.

Added water.—Amount of water added to the concrete mix in addition to that contained in the coarse aggregate and sand.

Total water.—Amount of water in the concrete mix including added water and surface moisture in the coarse aggregate and sand.

Pump pressure.—Hydraulic pressure required to drive the pump.

Saturated surface dry weight.—Weight of coarse and fine aggregates including water contained in pores of these aggregates.

For quite sometime it has been known that many advantages would be realized if a satisfactory way could be found of handling or placing ready mixed concrete by pumping instead of conventional methods (e.g., bucket and crane). These advantages include for instance better uniformity of mixes, continuity of delivery, greater accessability to difficult pouring sites, improved finish to set concrete, and substantial savings in labor costs.

Regardless of the type of convenitonal concrete mix (e.g., normal-weight concrete or light-weight concrete) the following problems are encountered, often causing partial or complete line blockage in attempts to pump the concrete.

(A) Aggregate segregation occurs when the pump pressure pushes the mortar portion of the mix through and past the mixed aggregate;

(B) Excessive bleeding (i.e., loss of water from the mortar portion of the mix);

(C) High pipe-wall friciton.

In addition in light-weight concrete there may be considerable absorption of water by the coarse aggregate causing line blockage. Segregation and bleeding generally have a greater tendency to occur in low-strength to moderate-strength (relatively low cement content) mixes and are a result of too much void space between the aggregate particles. Hence, under pressure the mortar or water in the mortar is readily forced through. By decreasing the void space through the addition of more fine aggregate (sand or cement), a network of smaller voids is produced. This network, then, more effectively resists the movement of mortar or water through it and aids the water within the mix in transmitting pressure better. Oversanding, as this measure is termed, not only reduces void space, but also has the adverse effects of both reducing compressive strength through "dilution" of the cement within the mix (since the water/cement ratio must also be increased) and in increasing the tendency of the concrete to shrink and crack while curing. Hence, additional cement (overcementing) is usually added to compensate for these adverse property changes. Concurrent with overstanding and overcementing is also the removal of coarse aggregate in equal volume (cubic feet) to compensate for the added volume of cement, sand and water. With high-strength (high cement content) design mixes, non-pumpability may be due to the reverse situation, i.e. an excess of fine aggregate or a poorly graded fine aggregate. Consequently, either a regraded fine aggregate having a lower fines content or more water can be added to reduce the formerly high friction at the pipe wall and permit the mix to be pumped.

In addition to the three problems outlined above, attempts to pump light-weight concrete also encounters the problem of too much absorption of water by the coarse aggregate, causing line blockage. Again the same unsatisfactory remedies, i.e. oversanding, overcementing and removal of coarse aggregate are used.

It has been found that in accordance with the present invention that the addition of hydroxyethyl cellulose (HEC) to concrete mixes renders them readily pumpable without otherwise modifying their compositions and also without adversely affecting their desirable properties.

The following examples illustrate specific embodiments of the present invention. In the examples the amounts of ingredients are on an air dry basis by weight of the total mix (1 cubic yard volume basis) unless otherwise specified. These examples represent the conditions used and results obtained with concrete mixes employed in the actual construction of buildings. These examples are not intended to limit the invention beyond the scope of the appended claims.

The procedure used for preparing the concrete mixes of the following examples was as follows except as shown in Examples 19 and 20:

(1) Added a major portion (usually at least about 75%) of the coarse aggregate and fine aggregate, the fine aggregate (i.e., sand) containing the HEC admixed therewith.

(2) Added the water (having admixed therewith the ingredients including, e.g. air entraining agent, water reducing agent, etc. where used).

(3) Added the cement.

(4) Added the remainder of the coarse aggregate and sand.

Additions 1 to 4 above were made while admixing.

(5) Mixed an additional 1–2 mins.

(6) Discharged the resulting mix into a concrete truck and mixed an additional 15–30 mins. mostly while enroute to the building site where the concrete mix was used.

Table I, Examples 1–3 below, illustrate the above principles (i.e., substantially changing the proportions of the ingredients of standard-mix design concrete to render it pumpable) using normal-weight concrete, and show the improvements resulting from addition of HEC to a standard-mix design concrete.

TABLE I.—EXAMPLES 1–3

Conventional method and improved method (addition of HEC) to impart pumpability to normal-weight concrete mixes Strength requirement: 4,000 p.s.i. concrete
Pump: Burnam & Sims piston.
Pumping distance: 100 ft. horizontal plus 50 ft. vertical

|  | Standard-mix design, w/o HEC | Pump-mix design, w/o HEC | Standard-mix design, w/ HEC |
|---|---|---|---|
| Example | 1 | 2 | 3 |
| HEC, lb | None | None | ¼ |
| Cement, lbs | 584 | ¹ 678 | 584 |
| Coarse aggregate (50-50 blend of natural and crushed lime stone), lbs | 1,910 | 1,450 | 1,910 |
| Fine aggregate (50-50 blend of natural and crushed sand), lbs | 1,050 | ² 1,350 | 1,050 |
| Added water, gal | 33½ | 39½ | 33½ |
| Air-entraining agent (Vinsol resin soap), oz | 3.1 | 3.6 | 3.1 |
| Water-reducing agent (sodium lignin sulfonate), oz | 23⅓ | 27 | 23⅓ |
| Slump, inches | 4 | 4 | 4 |
| Total air, percent ³ | 5 | 5 | 6 |
| Pumping rate, yd.³/hr | (⁴) | 33 | 33 |
| Pump pressure, p.s.i | (⁵) | 700–800 | 500–550 |
| 28-day comp. st., p.s.i | 4,300 | 4,500 | 4,500 |

¹ Over-cementing.
² Over-sanding.
³ In this and all other examples determined by ASTM Method C-173-68.
⁴ Would not pump.
⁵ Built up to 1,000 p.s.i. and relief valve opened.

Tables II–VI show relative pumpability of various structural light-weight concrete mixes without HEC and with HEC of the present invention under various conditions regarding pumping rate, type pump, and so forth. In all of these examples the amounts of the coarse and fine aggregates are expressed on a loose and dry volume basis.

TABLE II.—EXAMPLES 4–6

Advantages of HEC addition versus change of mix design with light-weight structural concrete Strength requirement: 3,000 p.s.i. concrete
Pump: Thomsen 740-C piston with flapper valve
Pumping distance: 20 ft. horizontal plus 45 ft. vertical

|  | Standard-mix design, w/o HEC | Pump-mix design, w/o HEC | Standard-mix design, w/ HEC |
|---|---|---|---|
| Example | 4 | 5 | 6 |
| HEC, lb | None | None | ¼ |
| Cement, lbs | 470 | 620 | 470 |
| Coarse aggregate (¾ in. expanded shale, "Norlite"), ft.³ | 18.0 | 16.3 | 18.0 |
| Fine aggregate (natural sand), ft.³ | 14.1 | 12.8 | 14.1 |
| Total water, gal | 25 | 32 | 25 |
| Air-entraining agent (sulfonated hydrocarbon, "Darex"), oz | 2.5 | 3.3 | 2.5 |
| Slump, inches | 5½ | 4 | 4 |
| Total air, percent | 5 | 5 | 6 |
| Pumping rate, yds.³/hr | (¹) | 10 | 80 |
| Pump pressure, p.s.i | (²) | 1,100 | 400 |
| 28-day comp. st., p.s.i | 3,200 | -------- | 3,900 |

¹ Would not pump.
² Built up to 1,250 p.s.i. and relief valve opened.

TABLE III.—EXAMPLES 7 AND 8

HEC addition versus change of mix design for another light-weight structural concrete Strength requirement: 3,000 p.s.i. concrete
Pump: Thomsen 740-C piston with flapper valve
Pumping distance: 30 ft. horizontal plus 45 ft. vertical

|  | Standard-mix design, w/HEC | Pump-mix design, w/o HEC |
|---|---|---|
| Example | 7 | 8 |
| HEC, lb | ¼ | None |
| Cement, lbs | 517 | 541 |
| Coarse aggregate (¾ in. expanded clay, "Texas Haydite"), ft.³ | 17.7 | 12.3 |
| Fine aggregate (natural sand), ft.³ | 13.5 | 15.8 |
| Total water, gal | 50 | 57 |
| Air-entraining agent (Vinsol resin soap), oz | 2.8 | 2.9 |
| Set retarder (hydroxylated carboxylic acid), oz | 11 | 11 |
| Slump, inches | 5½ | 7½ |
| Total air, percent | 5 | 5 |
| Pumping rate, yds. ³/hr | 50 | ¹50 |
| Pump pressure, p.s.i | 350–500 | ² 700–900 |
| 28-day comp. st., p.s.i | 3,400 | 3,500 |

¹ Decreasing to zero.
² Increasing to 1,250 p.s.i. when relief valve opened.

The pumping rate of Example 7 was increased from 50 yds.³/hr. to 105.³/hr. at which rate the pump pressure was 650 p.s.i.

EXAMPLES 10 AND 11

The concrete mixes of Examples 7 and 8 were pumped using a Whiteman P-80 double piston pump at the rate of 50 yds.³/hr. over a horizontal distance of 122 ft. plus a vertical distance of 250 ft. The pump pressures required to pump these mixes were 900 p.s.i. and 1200 p.s.i. respectively.

TABLE IV.—EXAMPLES 12 AND 13

Demonstration of pumpability of light-weight structural concrete through addition of HEC Strength Requirement: 3,300 p.s.i. concrete
Pump: Thomsen 740-C piston with flapper valve
Pumping distance: 200 ft. horizontal plus 90 ft. vertical

|  | Standard-mix design, w/HEC | Pump-mix design, w/o HEC |
|---|---|---|
| Example | 12 | 13 |
| HEC, lb | ¼ | None |
| Cement, lb | 658 | 658 |
| Coarse aggregate (¾ in. expanded shale, "Norlite"), ft.³ | 14.7 | 12.9 |
| Fine aggregate (natural sand), ft.³ | 12.8 | 14.5 |
| Total water, gal | 46.5 | 53 |
| Air-entraining agent (Vinsol resin soap), oz | 2.6 | 7.9 |
| Water-reducing agent (water soluble synthetic polymer), oz | 20 | 20 |
| Slump, inches | 6 | 9 |
| Total air, percent | 5 | 5 |
| Pumping rate, yds.³/hr | 50 | (¹) |
| Pump pressure, p.s.i | 700 | (²) |
| 28-day comp. st., p.s.i | 4,300 | 2,800 |

¹ Erratic, then stopped.
² Pressure built up and relief valve opened at 1,250 p.s.i.

TABLE V.—EXAMPLES 14 AND 15

Providing pumpability of light-weight structural concrete through addition of HEC Strength requirement: 3,500 p.s.i. concrete
Pump: Whiteman P-80 double piston
Pumping distance: 300 ft. horizontal

|  | Standard-mix design, w/HEC | Standard-mix design, w/o HEC |
|---|---|---|
| Example | 14 | 15 |
| HEC, lb | ¼ | None |
| Cement, lbs | 611 | 611 |
| Coarse aggregate (¾ in. expanded shale, "Solite"), ft.³ | 16.4 | 16.4 |
| Fine aggregate (50-50 blend of natural and crushed sand), ft.³ | 13.7 | 13.7 |
| Total water, gal | 48 | 48 |
| Air-entraining agent (Vinsol resin soap), oz | 2.4 | 4.8 |
| Slump, inches | 5 | 5 |
| Total air, percent | 5 | 5 |
| Pumping rate, yds.³/hr | 50 | (¹) |
| Pump pressure, p.s.i | 700 | (²) |
| 28-day comp. st., p.s.i | 3,800 | 3,80- |

¹ Would not pump.
² Built up to 1,500 p.s.i. and relief valve opened.

EXAMPLES 16 AND 17

For Example 16, Example 14 was repeated except using a Challenge-Cook "Squeeze-Crete" squeeze hose pump. A pumping rate of 35 yds.³/hr. was achieved at an applied pump pressure of 140 p.s.i. For Example 17, Example 15 was repeated except using the "Squeeze-Crete" pump. No pumping was effected up to an applied pressure of 250 p.s.i. at which point the relief valve opened.

Table VI below exemplifies pumping standard-mix concrete containing HEC of the present invention to a height of 230 feet, this height being the vertical distance from the concrete pump to the top floor of a building under construction.

TABLE VI.—EXAMPLE 18

Pumping light-weight structural concrete containing HEC

Strength Requirement: 3,000 p.s.i. concrete
Pump: Whiteman P-80 double piston
Pumping distance: 230 ft. vertical

|  | Standard-mix design, w/HEC |
|---|---|
| Example | 18 |
| HEC | ¼ lb. |
| Cement | 658 lbs. |
| Coarse aggregate (¾ in. expanded shale, "Nytralite") | 15.6 ft.³ |
| Fine aggregate (natural sand) | 12.8 ft.³ |
| Total water | 48 gal. |
| Air-entraining agent (Vinsol resin soap) | 3.5 oz. |
| Slump | 6 in. |
| Total air | 5%. |
| Pumping rate | 50 yds.³/hr. |
| Pump pressure | 1,900 p.s.i. |
| 28-day comp. st., p.s.i | 3,500. |

The following Examples 19 and 20 (Table VII) show the advantage which HEC of this invention has over methyl hydroxypropyl cellulose with regard to the accepted levels of total air content of hydraulic concretes. The ingredients in both mixes were charged to a central mixer in the order listed. Each mix was mixed for 4 minutes after charging and then transferred to a concrete mix truck. Each mix was mixed at 10 r.p.m. in the truck for 7 minutes followed by 14 minutes at 4 r.p.m. At the end of this 21-minute mixing period air contents and slumps were taken. Hence these two Examples 19 and 20 were carried out under substantially identical conditions using substantially identical concrete mixes except Example 19 contained HEC of the present invention whereas Example 20 contained methyl hydroxypropyl cellulose.

Further details appear in Table VII below.

TABLE VII.—EXAMPLES 19 AND 20

Advantage of HEC of this invention versus methyl hydroxypropyl cellulose in normal-weight concrete mixes regarding percent total air

|  | Standard-mix design w/HEC |  | Standard-mix design w/methyl hydroxypropyl cellulose [1] |
|---|---|---|---|
| Example | 19 | Example | 20 |
| Coarse aggregate (1 in. natural limestone), lbs. | 1,820 | Coarse aggregate (1 in. natural limestone), lbs. | 1,820 |
| Fine aggregate (natural sand), lbs.² and Dry HEC, lbs.² | 1,450<br><br>0.4 | Fine aggregate (natural sand), lbs.² and Dry methyl hydroxypropyl cellulose, lbs.² | 1,450<br><br>0.4 |
| Added water, gal | 28.5 | Added water, gal | 28.5 |
| Cement, lbs | 470 | Cement, lbs | 470 |
| Air-entraining agent (sulfonated hydrocarbon "Darex"), oz. | 2.5 | Air-entraining agent (sulfonated hydrocarbon "Darex"), oz. | 2.5 |
| Slump, inches | 4 | Slump, inches | 4¾ |
| Total air, percent | 6.0 | Total air, percent | 11.5 |

[1] The compound used was that commercially available as "Methocel 90HG 4000".
² Added mixed together.

The recommended maximum total air content for a normal-weight concrete is 7.5±1.0% as given by American Concrete Institute (A.C.I.) specifications (ACI Manual of Concrete Practice, Part 1, 1968 Standard 613–54). It will be noted that the mix incorporating HEC is within specifications, while the one prepared with methyl hydroxypropyl cellulose is considerably outside of specifications. One of the properties of concrete most seriously affected by air content is compressive strength. Each additional 1% of entrained air above the normal level of total air lowers the compressive strength by about 5%. Thus methyl hydroxypropyl cellulose at a level effective for improving pumpability increases percent total air to a level far beyond that acceptable.

The particular HEC used in this invention will be one having a viscosity from about 5000 cps. at 1% concentration in water to about 6500 cps. at 2% concentration, all viscosities being determined by a standard Brookfield LVF Synchrolectric Viscometer at 25° C. An HEC outside this viscosity range has been found to be ineffective for reducing pumping pressure. Preferably the M.S. will be about 1.8 to 3. The HEC used in the examples hereof had an M.S. of 2.5 and a 1% viscosity of 1500 cps.

The amount of HEC used is not critical and may vary considerably, usually the preferred range will be about 1/8–1 1/2 lbs. (about 3/16–5/16 lb. being specifically preferred) per cubic yard of concrete mix. The particular amount of HEC used depends on a number of factors, including e.g., the type concrete and type HEC used. For instance, a smaller amount of high viscosity HEC could be used with a light-weight insulating concrete than would be required to give substantially the same results with a heavy-weight concrete. As much as about 1 1/2 lbs. per cubic yard of HEC can be used in light-weight structural concrete with good results on increased pumpabiilty and no significant decrease in compressive strength.

Neither is the form of the HEC important at the time of addition. For example, the HEC may be added to the concrete mix (a) as a dry blend with the cement or sand, (b) in powder or granular form added with the water, or (c) as a solution in water. Methods (a) and (b) usually are most convenient. Method (c) is satisfactory but does require some additional equipment and time for preparing the solution.

Neither are the amounts of the other ingredients of the mixes critical in accordance with this invention. Moreover, once the artisan knows to use HEC he will be able to practice this invention within broad known variables without any difficulty because all the other information needed is readily available and well known in the art. Usually the amounts of other ingredients per cubic yarn of concrete mix will be approximately as follows, particularly for normal-weight concrete mixes and heavy-weight concrete mixes:

800–6500 lbs. preferably 1000–2500 lbs., coarse aggregate
700–2200 lbs., preferably 900–1800 lbs., fine aggregate
380–895 lbs., preferably 450–800 lbs., cement
30–48 gals., preferably 35–45 gals., water, and approximately as follows, particularly for light-weight structural concrete mixes and light-weight insulating concrete mixes:

17–34 cubic ft., preferably 27–33 cubic ft., coarse aggregate and fine aggregate total
190–800 lbs., preferably 325–750 lbs., cement
25–100 gals., preferably 35–75 gals., water, these amounts of ingredients being given on the same basis as the conventional practice in the art.

However, this invention is operable outside the foregoing ranges and there is no intention of restricting it thereto.

Although this invention has been described hereinbefore in large part with reference to concrete compositions or mixes containing the usual water, and of course this is the form in which they will be finally used, this invention also includes substantially dry concrete compositions (i.e. concrete compositions less added water).

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. A readily pumpable concrete mix wherein the amounts of ingredients per cubic yard are approximately as follows:
    (a) 1/8 to 1 1/2 lbs. of hydroxyethyl cellulose having an M.S. range of about 1.8 to 3 and a viscosity from about 5000 cps. at 1% concentration in water to about 6500 cps. at 2% concentration,
    (b) 800 to 6500 pounds of coarse aggregate,
    (c) 700 to 2200 pounds of fine aggregate,
    (d) 380 to 895 pounds of portland cement; and
    (e) 30 to 48 gallons of water.

2. A readily pumpable concrete mix wherein the amounts of ingredients per cubic yard are approximately as follows:
    (a) 3/16 to 5/16 pound of hydroxyethyl cellulose having an M.S. range of about 1.8 to 3 and a viscosity from about 5000 cps. at 1% concentration in water to about 6500 cps. at 2% concentration,
    (b) 1000 to 2500 pounds of coarse aggregate,
    (c) 900 to 1800 pounds of fine aggregate,
    (d) 450 to 800 pounds of portland cement; and
    (e) 35 to 45 gallons of water.

3. A readily pumpable concrete mix wherein the amounts of ingredients per cubic yard are approximately as follows:
    (a) 1/8 to 1 1/2 pounds of hydroxyethyl cellulose having an M.S. range of about 1.8 to 3 and a viscosity from about 5000 cps. at 1% concentration in water to about 6500 cps. at 2% concentration,
    (b) 17 to 34 cubic feet of coarse aggregate and fine aggregate total,
    (c) 190 to 800 pounds of portland cement; and
    (d) 25 to 100 gallons of water.

4. A readily pumpable concrete mix wherein the amounts of ingredients per cubic yard are approximately as follows:
    (a) 3/16 to 5/16 pound of hydroxyethyl cellulose having an M.S. range of about 1.8 to 3 and a viscosity from about 5000 cps. at 1% concentration in water to about 6500 cps. at 2% concentration,
    (b) 27 to 33 cubic feet of coarse aggregate and fine aggregate total,
    (c) 325 to 750 pounds of portland cement; and
    (d) 35 to 75 gallons of water.

References Cited

UNITED STATES PATENTS

| | | | |
|---|---|---|---|
| 2,580,565 | 1/1952 | Ludwig | 106—93 |
| 2,629,667 | 2/1953 | Kaveler | 106—93 |
| 3,243,307 | 3/1966 | Selden | 106—93 |
| 3,483,007 | 12/1969 | Hook | 106—93 |
| 3,489,582 | 1/1970 | Lindgren et al. | 106—97 |

FOREIGN PATENTS

| | | | |
|---|---|---|---|
| 24,980 | 1964 | Japan | 106—93 |
| 628,517 | 2/1963 | Belgium | 106—93 |

OTHER REFERENCES

Robson, T. D., "High-Alumina Cements and Concrete," John Wiley & Sons, Inc. p. 125 (1962).

JAMES E. POER, Primary Examiner

U.S. Cl. X.R.

106—97